United States Patent
Vetters et al.

(10) Patent No.: US 10,718,226 B2
(45) Date of Patent: Jul. 21, 2020

(54) CERAMIC MATRIX COMPOSITE COMPONENT ASSEMBLY AND SEAL

(71) Applicant: Rolls-Royce Corporation, Indianapolis, IN (US)

(72) Inventors: Daniel K. Vetters, Indianapolis, IN (US); Jeffrey Walston, Indianapolis, IN (US); David J. Thomas, Brownsburg, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 138 days.

(21) Appl. No.: 15/819,675

(22) Filed: Nov. 21, 2017

(65) Prior Publication Data
US 2019/0153886 A1    May 23, 2019

(51) Int. Cl.
| | | |
|---|---|---|
| *F01D 11/08* | (2006.01) | |
| *F01D 25/24* | (2006.01) | |
| *F01D 25/00* | (2006.01) | |

(52) U.S. Cl.
CPC ............ *F01D 11/08* (2013.01); *F01D 25/005* (2013.01); *F01D 25/246* (2013.01); *F05D 2220/32* (2013.01); *F05D 2240/11* (2013.01); *F05D 2240/55* (2013.01); *F05D 2240/57* (2013.01); *F05D 2260/30* (2013.01); *F05D 2300/6033* (2013.01)

(58) Field of Classification Search
CPC ...... F01D 11/005; F01D 11/08; F01D 25/005; F01D 25/246; F16J 15/02; F16J 15/12; F16J 15/122; F05D 2260/30; F05D 2240/55
USPC ......... 277/643, 650, 653, 654; 415/138, 139
See application file for complete search history.

(56) References Cited

U.S. PATENT DOCUMENTS

| | | |
|---|---|---|
| 3,661,197 A | 5/1972 | Peterson |
| 3,775,921 A | 12/1973 | Avera |
| 4,452,462 A | 6/1984 | Karr |
| 4,529,355 A | 7/1985 | Wilkinson |
| 4,749,333 A | 6/1988 | Bonner et al. |
| 4,759,687 A | 7/1988 | Miraucourt et al. |
| 5,143,384 A | 9/1992 | Lipschitz |
| 5,188,506 A | 2/1993 | Creevy et al. |
| 5,320,486 A | 6/1994 | Walker et al. |
| 5,927,942 A | 7/1999 | Stahl et al. |
| 6,312,218 B1 | 11/2001 | Beeck et al. |
| 6,464,456 B2 | 10/2002 | Darolia et al. |
| 6,503,051 B2 | 1/2003 | Predmore |
| 6,808,363 B2 | 10/2004 | Darkins, Jr. et al. |
| 6,857,639 B2 | 2/2005 | Beeck et al. |
| 6,893,214 B2 | 5/2005 | Alford et al. |
| 6,935,836 B2 | 8/2005 | Ress, Jr. et al. |
| 7,080,513 B2 | 7/2006 | Reichert |
| 7,090,459 B2 | 8/2006 | Bhate et al. |
| 7,101,147 B2 | 9/2006 | Balsdon |
| 7,261,514 B2 | 8/2007 | London et al. |
| 7,347,425 B2 | 3/2008 | James |
| 7,360,769 B2 | 4/2008 | Bennett |
| 7,374,395 B2 | 5/2008 | Durocher et al. |
| 7,445,425 B2 | 11/2008 | Ferra et al. |

(Continued)

*Primary Examiner* — Kenneth Bomberg
*Assistant Examiner* — Elton K Wong
(74) *Attorney, Agent, or Firm* — Barnes & Thornburg LLP (57) ABSTRACT

A gas turbine engine assembly adapted to separate a high pressure zone from a low pressure zone includes a seal configured to block gasses from passing through the interface of two adjacent components. The seal assembly includes a strip seal.

20 Claims, 6 Drawing Sheets

(56) References Cited

U.S. PATENT DOCUMENTS

| | | |
|---|---|---|
| 7,744,096 B2 | 6/2010 | Kono |
| 7,771,159 B2 | 8/2010 | Johnson et al. |
| 7,870,738 B2 | 1/2011 | Zborovsky et al. |
| 8,047,773 B2 | 11/2011 | Bruce et al. |
| 8,079,600 B2 | 12/2011 | Shojima et al. |
| 8,132,442 B2 | 3/2012 | Merrill et al. |
| 8,206,087 B2 | 6/2012 | Campbell et al. |
| 8,206,092 B2 | 6/2012 | Tholen et al. |
| 8,240,985 B2 | 8/2012 | Martin |
| 8,246,299 B2 | 8/2012 | Razzell et al. |
| 8,257,044 B2 | 9/2012 | Hayasaka et al. |
| 8,303,245 B2 | 11/2012 | Foster et al. |
| 8,496,431 B2 | 7/2013 | Habarou et al. |
| 8,684,680 B2 | 4/2014 | Martin et al. |
| 8,769,817 B2 | 7/2014 | Bridges et al. |
| 8,790,067 B2 | 7/2014 | McCaffrey et al. |
| 8,834,105 B2 | 9/2014 | Albers et al. |
| 8,905,709 B2 | 12/2014 | Dziech et al. |
| 9,182,039 B2 | 11/2015 | Aschenbruck et al. |
| 9,353,635 B2 | 5/2016 | Jadhav et al. |
| 9,534,500 B2 | 1/2017 | Bouchard et al. |
| 9,581,038 B2 | 2/2017 | Hillier et al. |
| 9,714,580 B2 | 7/2017 | Slavens et al. |
| 9,726,043 B2 | 8/2017 | Franks et al. |
| 9,757,920 B2 | 9/2017 | Lazur |
| 9,759,079 B2 | 9/2017 | Sippel et al. |
| 9,784,116 B2 | 10/2017 | Hafner et al. |
| 9,863,323 B2 | 1/2018 | Kirtley et al. |
| 9,926,790 B2 | 3/2018 | Landwehr et al. |
| 9,945,256 B2 | 3/2018 | Freeman et al. |
| 9,938,846 B2 | 4/2018 | Freeman et al. |
| 9,988,923 B2 | 6/2018 | Snyder et al. |
| 10,094,231 B2 | 10/2018 | Dev et al. |
| 10,138,747 B2 | 11/2018 | Dev et al. |
| 10,138,749 B2 | 11/2018 | McCaffrey |
| 10,151,209 B2 | 12/2018 | Boeck |
| 10,161,258 B2 | 12/2018 | McCaffrey et al. |
| 10,196,911 B2 | 2/2019 | Jenkins et al. |
| 10,196,918 B2 | 2/2019 | McCaffrey et al. |
| 10,247,024 B2 | 4/2019 | Dev et al. |
| 2004/0120808 A1* | 6/2004 | Alford ............ F01D 9/04 415/173.1 |
| 2004/0195783 A1 | 10/2004 | Akagi et al. |
| 2006/0082074 A1 | 4/2006 | Synnott et al. |
| 2009/0096174 A1 | 4/2009 | Spangler et al. |
| 2009/0110546 A1 | 4/2009 | Tholen et al. |
| 2010/0129211 A1* | 5/2010 | Hart ............... F01D 9/042 415/209.3 |
| 2010/0247298 A1* | 9/2010 | Nakamura ........ F01D 11/18 415/173.1 |
| 2012/0171027 A1 | 7/2012 | Albers et al. |
| 2013/0202433 A1 | 8/2013 | Hafner |
| 2014/0154062 A1 | 6/2014 | Weber et al. |
| 2015/0016971 A1 | 1/2015 | Freeman et al. |
| 2016/0017721 A1 | 1/2016 | Landwehr et al. |
| 2016/0194974 A1 | 7/2016 | Blaney et al. |
| 2016/0245108 A1 | 8/2016 | Sippel et al. |
| 2016/0319686 A1* | 11/2016 | Shi ................. F23R 3/007 |
| 2016/0348521 A1 | 12/2016 | Sippel et al. |
| 2017/0130600 A1* | 5/2017 | Shapiro ............ F01D 11/08 |
| 2017/0254220 A1 | 9/2017 | Hillier |
| 2017/0254272 A1 | 9/2017 | Hillier |
| 2018/0149029 A1 | 4/2018 | Vetters et al. |
| 2018/0195401 A1 | 7/2018 | Sippel et al. |
| 2018/0363478 A1 | 12/2018 | Margolies et al. |

* cited by examiner

CERAMIC MATRIX COMPOSITE COMPONENT ASSEMBLY AND SEAL

FIELD OF THE DISCLOSURE

The present disclosure relates generally to gas turbine engines, and more specifically to seals used in gas turbine engines.

BACKGROUND

Gas turbine engines are used to power aircraft, watercraft, power generators, and the like. Adjacent components in a gas turbine engine are often separated by a small gap sometimes called a split line. The small gap allows for variations in manufacturing tolerance of the adjacent components and for expansion/contraction of the components that occurs during operation of the gas turbine engine.

The small gaps between adjacent components may be sealed to prevent the leakage of air through the small gaps during operation of the turbine engine. In one example, turbine shroud assemblies that are used to block gasses from passing over turbine blades in an engine can include small gaps that can be sealed to control leaks through the turbine shroud assembly. In certain examples, turbine shroud assemblies can include components made from ceramic matrix composite materials that are designed for use in high temperature environments. Sealing between ceramic matrix composite components can present design challenges based on the unique material properties of the components.

Other assemblies used in high temperature environments and incorporating high temperature materials like ceramic matrix composite materials can also present design challenges related to sealing small gaps. For example, combustor assemblies, exhaust assemblies, and other heat shield assemblies may require sealing between components.

SUMMARY

The present disclosure may comprise one or more of the following features and combinations thereof.

According to the present disclosure, a gas turbine engine assembly may include a first component comprising ceramic matrix materials, a second component comprising ceramic matrix materials, and a strip seal. The second component may be arranged adjacent the first component to form a gap therebetween. Each of the first component and the second component may include a panel that separates a high pressure zone from a low pressure zone. The panels may include a body portion and an end portion. The end portions may include a seal-support shelf that provides a seal support surface facing the high pressure zone that is located nearer to the low pressure zone than an outer surface of the body portion.

In illustrative embodiments, the strip seal may be arranged in a channel having a floor defined by the seal-support surfaces of the first component and the second component that opens to face the high pressure zone. The strip seal may be sized to extend across the gap between the first component and the second component.

In illustrative embodiments, the gas turbine engine assembly may include a backing plate. The backing plate may be mounted over the channel to block movement of the strip seal out of the channel.

In illustrative embodiments, the end portion of each of the first component and the second component may include a plate-support shelf that provides a plate support surface arranged to face the high pressure zone. The plate support surfaces may be located nearer to the low pressure zone than the outer surface of the body portion such that the plate support surface cooperates with the seal support surface to partially define the channel.

In illustrative embodiments, an outer surface of the backing plate is substantially flush with the outer surface of the body portion of the panel included in the first component. In illustrative embodiments, the end portion of the panels may include a forward shoulder and an aft shoulder shaped to block movement of the strip seal and the backing plate out of the channel in forward and aft directions.

In illustrative embodiments, each of the first component and the second component may include an attachment feature that extends from the outer surface of the corresponding panel. The attachment feature may be configured to be coupled to a metallic carrier component. The attachment feature may extend over the plate-support surface to retain the backing plate in the channel.

In illustrative embodiments, the end portion of the panels included in the first component and the second component may include a forward shoulder and/or an aft shoulder. The forward and/or aft shoulders may be shaped to block movement of the strip seal out of the channel via motion in a forward or aft axial direction.

According to another aspect of the present disclosure, a turbine shroud assembly adapted for use in a gas turbine engine may include a first blade track segment comprising ceramic matrix materials, a second blade track segment comprising ceramic matrix materials and arranged adjacent the first component to form a gap therebetween, and a strip seal. The first blade track segment and the second blade track segment may each include a runner configured to interact with gas path gasses that extends partway around an axis and an attachment feature that extends radially outward from the runner away from the axis. The runners may include a body portion and an end portion. The end portions may include a seal-support shelf that provides a seal support surface facing away from the axis that is located nearer to the axis than an outer surface of the body portion.

In illustrative embodiments, the strip seal may be arranged in a channel having a floor defined by the seal-support surfaces of the first blade track segment and the second blade track segment. The channel may be arranged to open facing away from the axis. The strip seal may be sized to extend across the gap between the first blade track segment and the second blade track segment.

In illustrative embodiments, the turbine shroud assembly may include a backing plate. The backing plate may be mounted over the channel to block movement of the strip seal out of the channel.

In illustrative embodiments, the backing plate may be a generally rectangular component having a length that extends along the axis, a width that extends tangent to a circumference about the axis, and a thickness that extends away from the axis. The length of the backing plate may be greater than the width and thickness. The width of the backing plate may be greater than the thickness of the backing plate.

In illustrative embodiments, the end portions of the first blade track segment and the second blade track segment may include a plate-support shelf that provides a plate support surface. The plate support surfaces may face away from the axis and may be located nearer to the axis than an outer surface of the body portion while being further from the axis than the seal support surface. The plate support surfaces may cooperate with the seal support surfaces to partially define the channel.

In illustrative embodiments, an outer surface of the backing plate may be substantially flush with the outer surface of the body portion of the runner included in the first blade track segment. In illustrative embodiments, the end portions of the panels may include a forward shoulder and an aft shoulder shaped to block movement of the strip seal and the backing plate along the axis out of the channel in forward and aft directions.

In illustrative embodiments, the attachment features may extend over the plate-support surface to retain the backing plate in the channel. The attachment feature of the first blade track segment may have a T-shape cross section when viewed in a circumferential direction around the axis such that the first blade track segment has a generally I-beam shape cross section when viewed in a circumferential direction.

In illustrative embodiments, the attachment features may be formed to include a second strip seal slot. A second strip seal may be inserted into the second strip seal slot. The second strip seal may be located to block movement of the backing plate away from the axis out of the channel.

In illustrative embodiments, the end portions of the runners may include a forward shoulder. The forward shoulders may be shaped to block movement of the strip seal out of the channel via motion in a forward direction along the axis. The end portions of the runners may include an aft shoulder. The aft shoulders may shaped to block movement of the strip seal out of the channel via motion in an aft direction along the axis.

According to yet another aspect of the present disclosure, a method of assembling a turbine shroud assembly for a gas turbine engine is described. The method may include arranging a first blade track segment comprising ceramic matrix composite materials circumferentially adjacent to a second blade track segment comprising ceramic matrix composite materials to form a gap therebetween. Each of the first blade track segment and the second blade track segment may include a runner that extends partway around an axis and an attachment feature that extends radially outward from the runner away from the axis. The runners may include a body portion and an end portion with the end portion including a seal-support shelf that provides a seal support surface facing away from the axis that is located nearer to the axis than an outer surface of the body portion.

In illustrative embodiments, the method may include inserting a strip seal in a channel having a floor defined by the seal-support surfaces of the first blade track segment and the second blade track segment. The channel may be shaped to open facing away from the axis. The strip seal may be sized to extend across the gap between the first blade track segment and the second blade track segment These and other features of the present disclosure will become more apparent from the following description of the illustrative embodiments.

DETAILED DESCRIPTION

For the purposes of promoting an understanding of the principles of the disclosure, reference will now be made to a number of illustrative embodiments shown in the drawings and specific language will be used to describe the same.

Figures 1, 2:
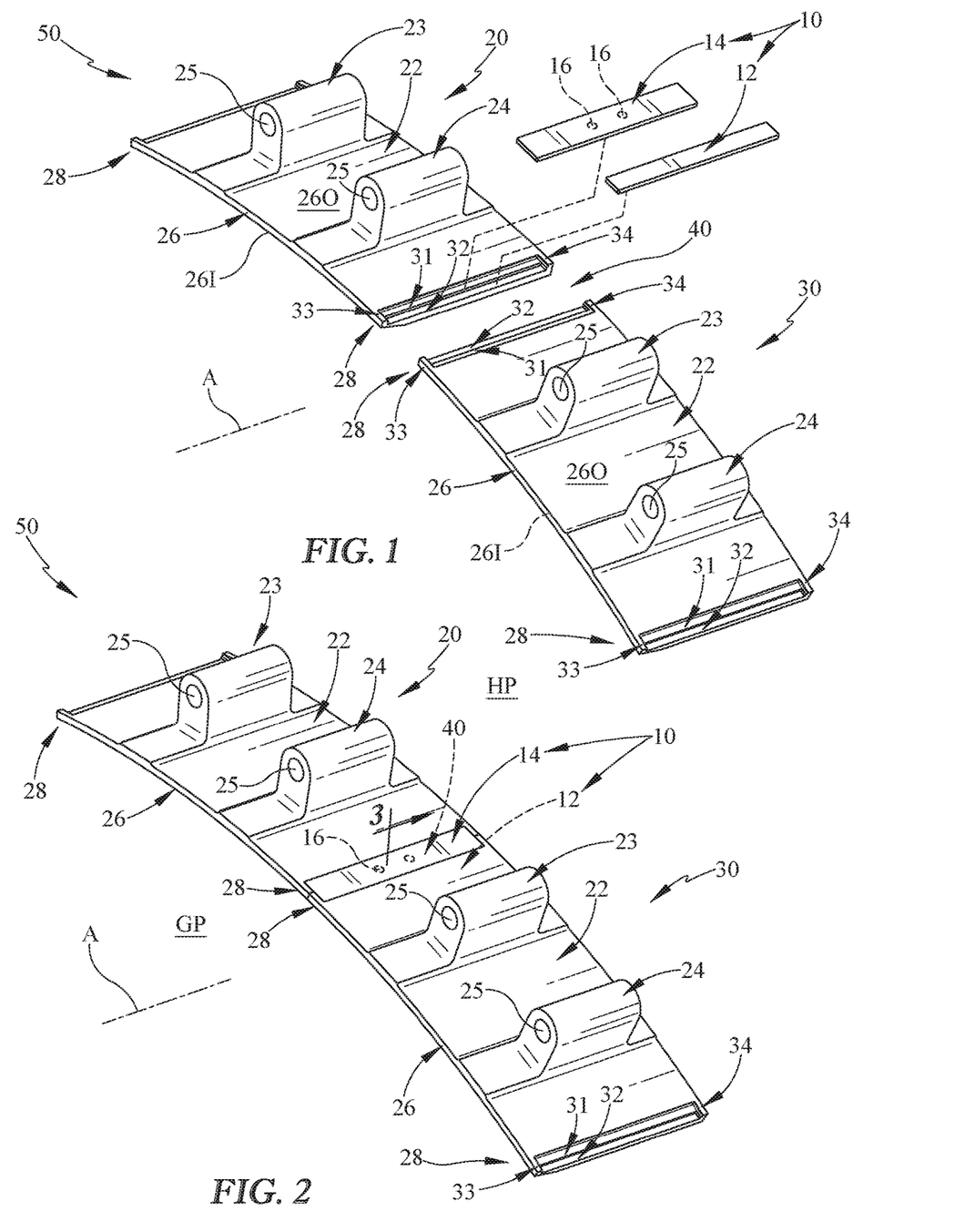
FIG. 1 is an exploded perspective view of a gas turbine engine assembly including a first blade track component, a second blade track component, and a seal assembly adapted to block gasses from passing through a gap formed at an interface between the first blade track component and the second blade track component showing that the seal assembly includes a strip seal and a backing plate.
FIG. 2 is a perspective view of the gas turbine engine assembly from FIG. 1 assembled to show that the seal assembly is received in a channel formed between the first blade track component and the second blade track component along radially-outwardly facing surfaces of the first blade track component and the second blade track component.

A seal assembly 10 is adapted to close a gap 11 between first and second adjacent blade track segments 20, 30 in a turbine shroud assembly 50 as shown in FIGS. 1 and 2. The turbine shroud assembly 50 is configured to extend around turbine blades included in a turbine rotor in an engine. The turbine shroud assembly 50 blocks gasses moving along a gas path GP in the engine from passing over the turbine blades without interacting with the turbine blades such that the turbine rotor is forced to rotate about an axis A.

Figure 3:
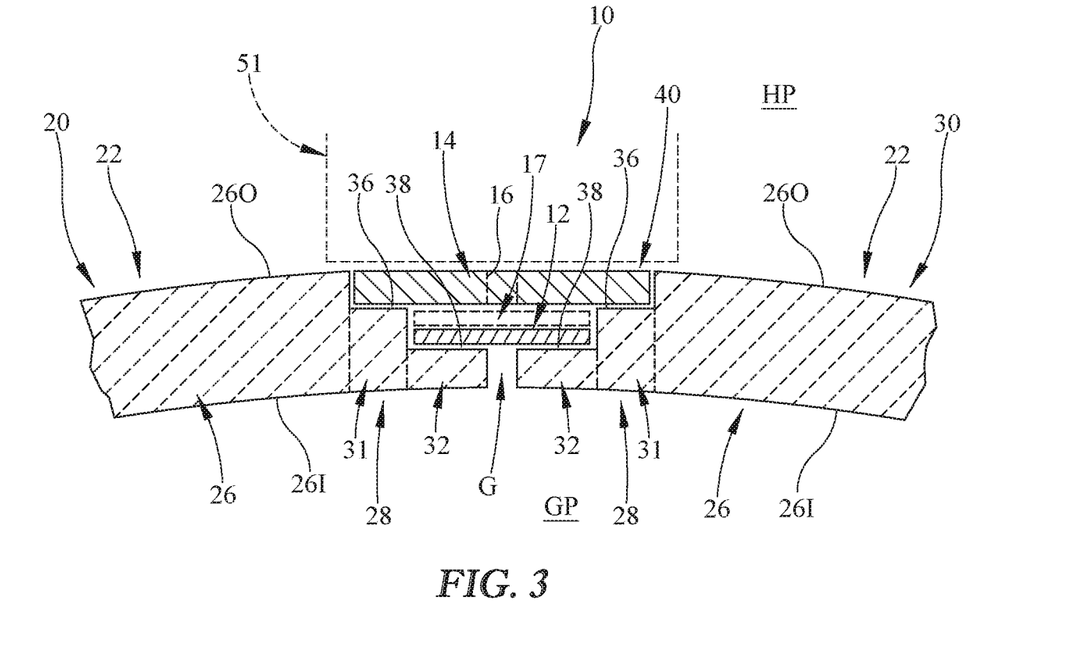
FIG. 3 is a cross sectional view of FIG. 2 showing that the channel provides inner shelves included in the blade track components that support the strip seal so that it seals across the gap at the interface of the blade track components and outer shelves included in the blade track components that support the backing plate radially outward of the strip seal so that the strip seal is blocked from falling out of the channel.

The seal assembly 10 includes a strip seal 12 and a backing plate 14 as shown in FIGS. 1 and 3. The strip seal 12 is located in a channel 40 defined at the interface of the first and second adjacent blade track segments 20, 30 near the gas path GP. The backing plate 14 blocks the strip seal 12 from moving out of the channel 40 and provides some further sealing of the gas path GP.

Each blade track segment 20, 30 is made from ceramic matrix composite materials configured to withstand high temperatures. Both blade track segments 20, 30 have substantially similar geometry as shown in FIGS. 1 and 2. Accordingly, only first blade track segment 20 is further described in detail but the description of the first blade track segment 20 applies equally to the second blade track segment 30 and identical reference numbers are applied to both.

The blade track segment 20 includes a runner 22 and attachment posts 23, 24 as shown in FIGS. 1 and 2. The runner 22, sometimes called a panel, is configured to interact with gasses in the gas path GP and extends partway around the axis A. The attachment posts 23, 24 extend radially outward from the runner 22 away from the axis A.

The runner 22 of each blade track segment 20, 30 directly faces the gas path GP to block gasses from passing over turbine blades. The runner 22 includes a body portion 26 and end portions 28 as shown in FIG. 1. The body portion 26 is arcuate and has a radially-inwardly facing inner surface 26I and a radially-outwardly facing surface 26O. The end portions 28 support the seal assembly 10 at circumferential ends of the body portion 26.

In the embodiment of FIGS. 1-3, the end portions 28 include a plate support shelf 31, a seal support shelf 32, and axial-retention shoulders 33, 34. The plate support shelf 30 extends circumferentially from the body portion 26 of the blade track segments 20, 30 and provides a plate support surface 36 on which a portion of the backing plate 14 rests. The seal support shelf 32 extends circumferentially from the retainer support shelf 30 and provides a seal support surface 38 on which a portion of the strip seal 12 rests. The axial-retention shoulders 33, 34 are located at the forward end and the aft end of the channel 40 that receives the seal assembly 10 and are shaped to block movement of the strip seal 12 and the backing plate 14 axially out of the channel 40. It is appreciated that the axial-retention shoulders 33, 34 may be omitted in some designs.

The plate support surfaces 36 and the seal support surfaces 38 of adjacent blade track segments 20, 30 partially define the channel 40 as shown in FIG. 3. The seal support surfaces 38 face away from the axis A and is located nearer to the axis A than the outer surface 26O of the body portion 26 included in the blade track segments 20, 30. The plate support surfaces 36 faces away from the axis A and are located nearer to the axis A than an outer surface 26O of the body portion 26 while being further from the axis A than the seal support surface 38. The seal support surfaces 38 cooperate to define a floor or radially-inner-most edge of the channel 40.

The strip seal 12 and the backing plate 14 are both illustratively metallic components that are free to float relative to the blade track segments 20, 30 to accommodate some relative motion of the segments 20, 30 as shown in FIGS. 1-3. Other materials may be used to construct the strip seal 12 and/or the backing plate 14. The strip seal 12 and the backing plate 14 are in the exemplary embodiment thin rectangular shaped components with an axial length greater than a circumferential width and having a thickness smaller than both length and width.

The backing plate 14 is illustratively sized so that an outer surface of the backing plate 14 is substantially flush with the radially-outer surface 26O of the body portion of the blade track segments 20, 30 as shown in FIGS. 2 and 3. In the illustrative embodiments, the backing plate 14 is larger and/or thicker than the strip seal 12. In some embodiments, optional bleed holes 16 may be formed in backing plate 14 to allow for pressurized air to push the strip seal 12 toward the gas path GP and into contact with end portions 28 of the blade track segments 20, 30.

In some embodiments, a compliant layer or member 17 can be included in the seal assembly 10 between the strip seal 12 and the backing plate 14. The compliant layer or member 17 is illustratively more compliant than both the strip seal 12 and the backing plate 14. The compliant layer or member 17 could locate the strip seal 12 against the seat at engine start up, regardless of the orientation. (upside down or right side up). The compliant layer or member 17 could locate the backing plate or strip 14 against radial strip seals 12, regardless of tolerance stack. This could greatly reduce parasitic leakage fore to aft through the radial strip seal bulkhead. Indeed, the compliant layer or member 17 could eliminate some of the fore to aft flow area in the cavity between the strip seal and backing strip, reducing parasitic loss and improving turbine efficiency by reducing blade bypass flow.

The compliant layer or member 17 could comprise Interam® material available from 3M. The compliant layer or member 17 could also be made from a foil wrapped compliant layer, a Waspaloy spring strip, or Rene-41 wave spring strip. Of course other suitable compliant layer or components could also be used.

When the blade track segments 20, 30 and seal assembly 10 are mounted in a turbine shroud assembly 50, the backing plate 14 is blocked from movement out of the channel 40 by a metallic carrier component 51 as shown in FIG. 3. However, other retention features may be used to hold the backing plate 14 in place.

Figure 3A:
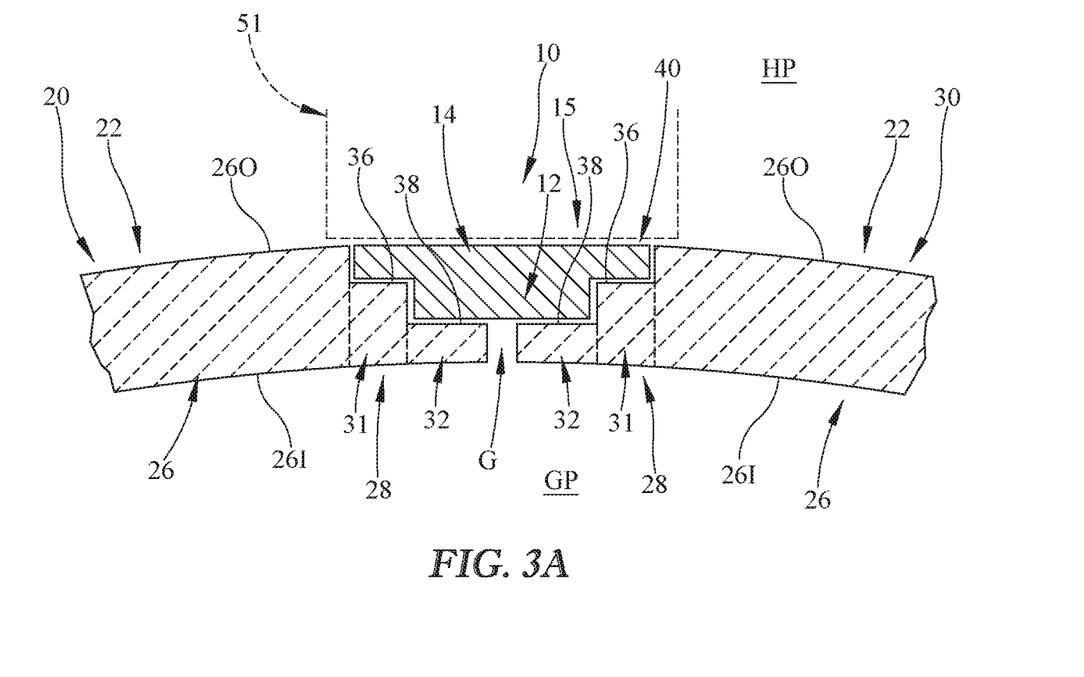
FIG. 3A is a cross sectional view like that of FIG. 3 showing that in optional embodiments, the strip seal and the backing plate can be provided by an integrally formed component having a T-shaped cross-section.

In some embodiments, the strip seal 12 and the backing plate 14 may be integrally formed into a single, one-piece component 15 as shown in FIG. 3A. The integrated component may have a T-shaped cross section when viewed along the axis A. In such embodiments, the part count of the turbine shroud assembly 50 may be reduced.

Turning again to blade track segments 20, 30, ceramic matrix composite material construction provides for high temperature environment capability. In illustrative embodiments, the segments 20, 30 may include silicon-carbide fibers suspended in a silicon-carbide matrix material; however, other materials may also be used. The runner 22 of each blade track segment 20, 30 separates a relatively-high pressure zone HP located radially outward of the runner 22 from the gas path GP that is a relatively low pressure zone. The attachment posts 23, 34 of each blade track segment 20, 30 are circumferentially spaced apart from one another and are formed to include axially-extending eyelets 25 that receive pins to couple the segments 20, 30 to a metallic carrier component 51.

Figures 4, 5:
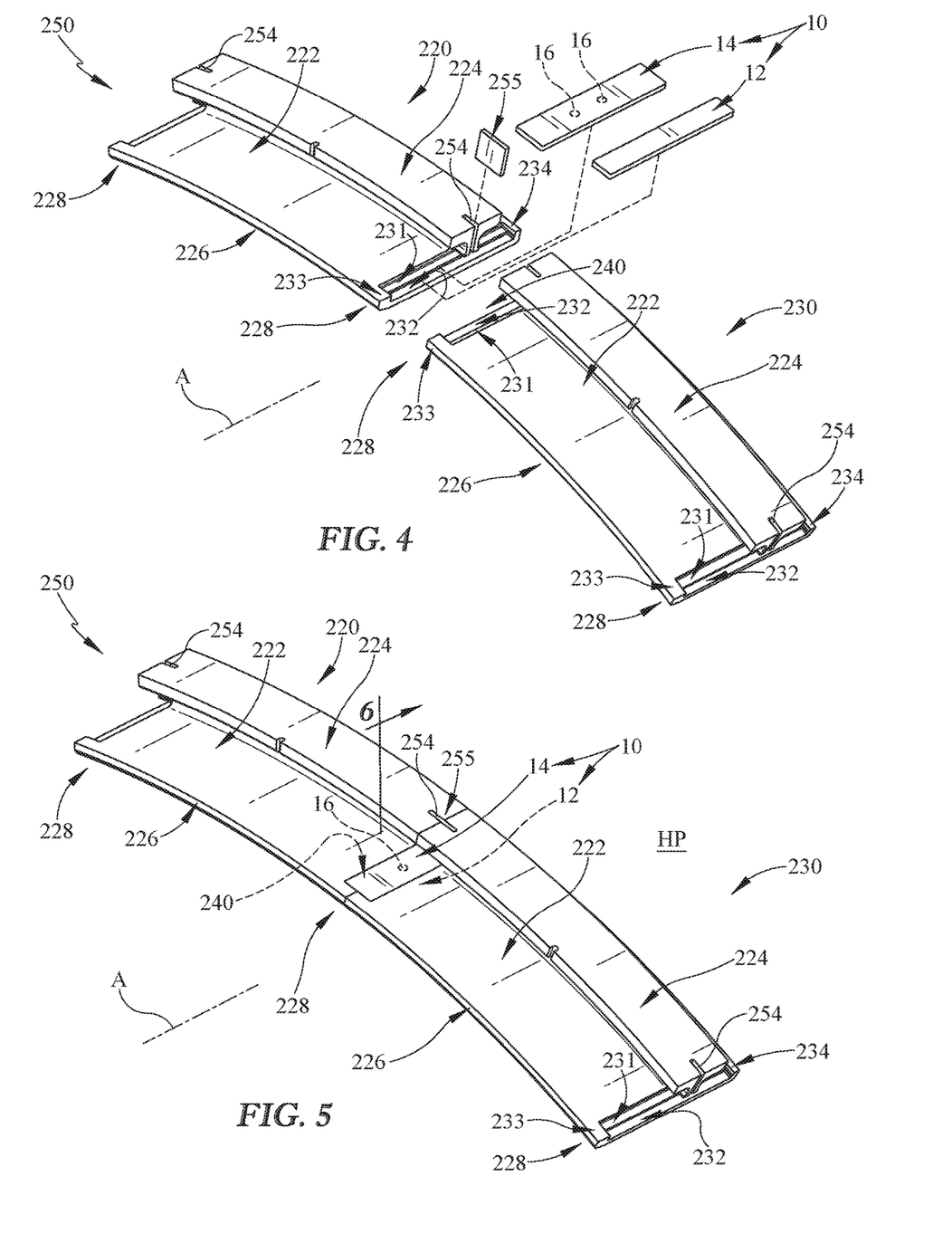
FIG. 4 is an exploded perspective view of a second gas turbine engine assembly including a first blade track component, a second blade track component, and a seal assembly adapted to block gasses from passing through a gap formed at an interface between the first lade track component and the second blade track component showing that the seal assembly includes a strip seal and a backing plate.
FIG. 5 is a perspective view of the gas turbine engine assembly from FIG. 4 assembled to show that the seal assembly is received in a channel formed between the first blade track component and the second blade track component along radially-outwardly facing surfaces of the first blade track component and the second blade track component.
Figure 6:
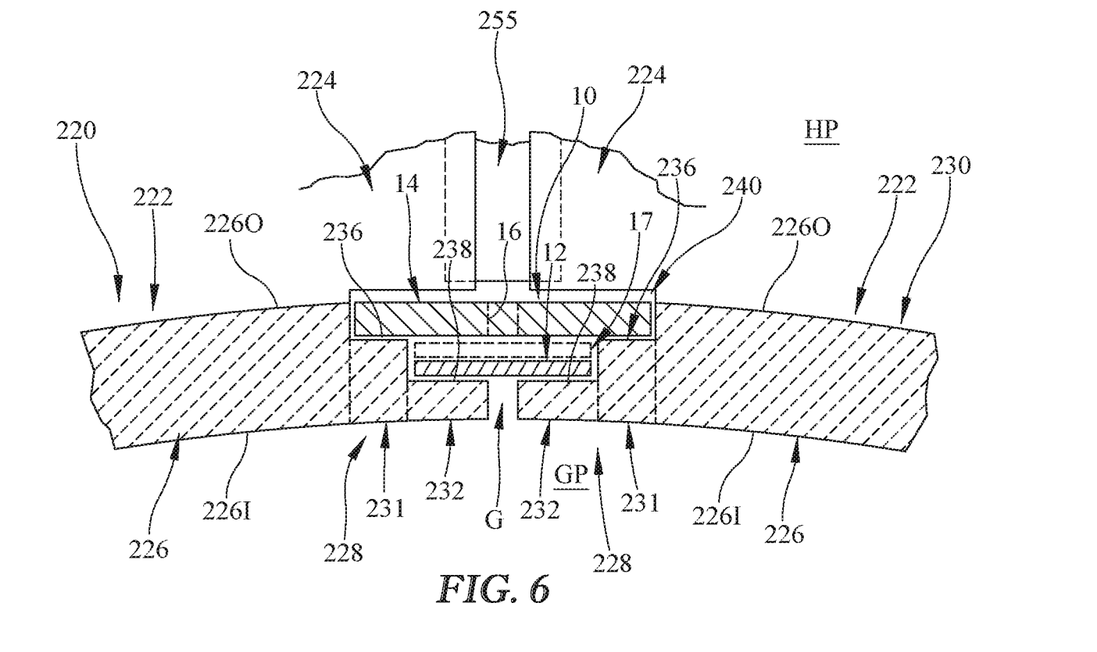
FIG. 6 is a cross sectional view of FIG. 5 showing that strip seal seals across the gap at the interface of the blade track components and that the strip seal is blocked from falling out of the channel and further showing that attachment features of the blade track components are arranged to retain the backing plate in the channel.

In a second embodiment of the present disclosure, shown in FIGS. 4-6, the seal assembly 10 is used with blade track segments 220, 230 as part of a turbine shroud assembly 250. In this embodiment, attachment posts 224 extend radially over the seal assembly 10 to retain the seal assembly 10 in a channel 240 defined at the interface of the blade track segments 220, 230.

Each blade track segment 220, 230 is made from ceramic matrix composite materials configured to withstand high temperatures. Both blade track segments 220, 230 have substantially similar geometry as shown in FIGS. 4 and 5. Accordingly, only first blade track segment 220 is further described in detail but the description of the first blade track segment 220 applies equally to the second blade track segment 230 and identical reference numbers are applied to both.

The blade track segment 220 includes a runner 222 and an attachment post 224 as shown in FIGS. 4 and 5. The runner 222, sometimes called a panel, is configured to configured to interact with gasses in the gas path GP and extends partway around the axis A. The attachment post 224 extends radially outward from the runner 222 away from the axis A.

The runner 222 of each blade track segment 220, 230 directly faces the gas path GP to block gasses from passing over turbine blades. The runner 222 includes a body portion 226 and end portions 228 as shown in FIG. 4. The body portion 226 is arcuate and has a radially-inwardly facing inner surface 226I and a radially-outwardly facing surface 226O. The end portions 228 support the seal assembly 10 at circumferential ends of the body portion 226.

In the embodiment of FIGS. 4-6, the end portions 228 include a plate support shelf 231, a seal support shelf 232, and axial-retention shoulders 233, 234. The plate support shelf 230 extends circumferentially from the body portion 226 of the blade track segments 220, 230 and provides a plate support surface 236 on which a portion of the backing plate 14 rests. The seal support shelf 232 extends circumferentially from the retainer support shelf 230 and provides a seal support surface 38 on which a portion of the strip seal 12 rests. The axial-retention shoulders 233, 234 are located at the forward end and the aft end of the channel 240 that receives the seal assembly 10 and are shaped to block movement of the strip seal 12 and the backing plate 14 axially out of the channel 240.

The plate support surfaces 236 and the seal support surfaces 238 of adjacent blade track segments 220, 230 partially define the channel 240 as shown in FIG. 6. The seal support surfaces 238 face away from the axis A and is located nearer to the axis A than the outer surface 226O of the body portion 226 included in the blade track segments 220, 230. The plate support surfaces 236 faces away from the axis A and are located nearer to the axis A than an outer surface 226O of the body portion 226 while being further from the axis A than the seal support surface 238. The seal support surfaces 238 cooperate to define a floor or radially-inner-most edge of the channel 240.

The runner 222 of each blade track segment 220, 230 separates a relatively-high pressure zone HP located radially outward of the runner 222 from the gas path GP that is a relatively low pressure zone. The attachment post 224 of each blade track segment 220, 230 extends circumferentially along the radially outer surface 226O of the body portion 226 included in the runner 222. The attachment post 224 has a T-shape cross section when viewed in the circumferential direction and cooperates with the runner 222 to define a generally I-beam shape cross section of the blade track segments 220, 230.

The attachment post 224 extends partway over channel 240 and retains the backing plate 14 in the channel 240 as shown in FIG. 6. In addition, in the exemplary embodiment, a second strip seal 255 is inserted into a slot 254 formed in the attachment post 224 and the second strip seal 255 is located to block movement of the backing plate 14 away from the axis out of the channel 240.

Figure 6A:
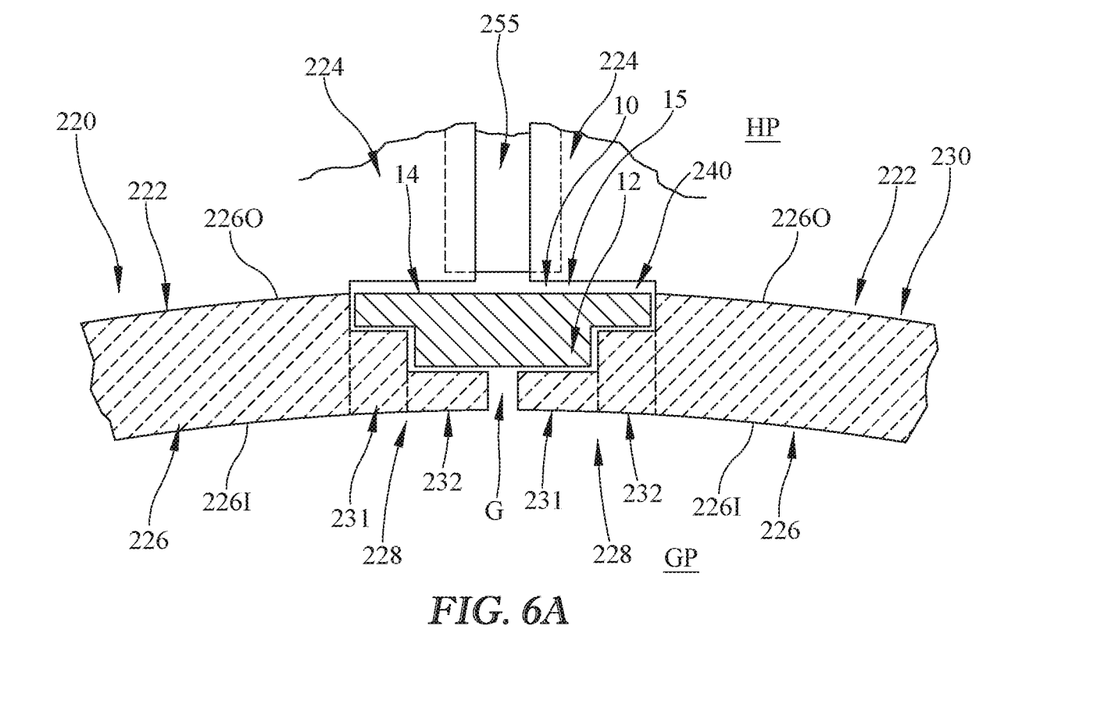
FIG. 6A is a cross sectional view like that of FIG. 6 showing that in optional embodiments, the strip seal and the backing plate can be provided by an integrally formed component having a T-shaped cross-section.

As in the first embodiment, In some embodiments, the strip seal 12 and the backing plate 14 may be integrally formed into a single, one-piece component 15 that is used in the second embodiment of the turbine shroud assembly 250 as shown in FIG. 6A. The integrated component may have a T-shaped cross section when viewed along the axis A. In such embodiments, the part count of the turbine shroud assembly 250 may be reduced.

Figure 7:
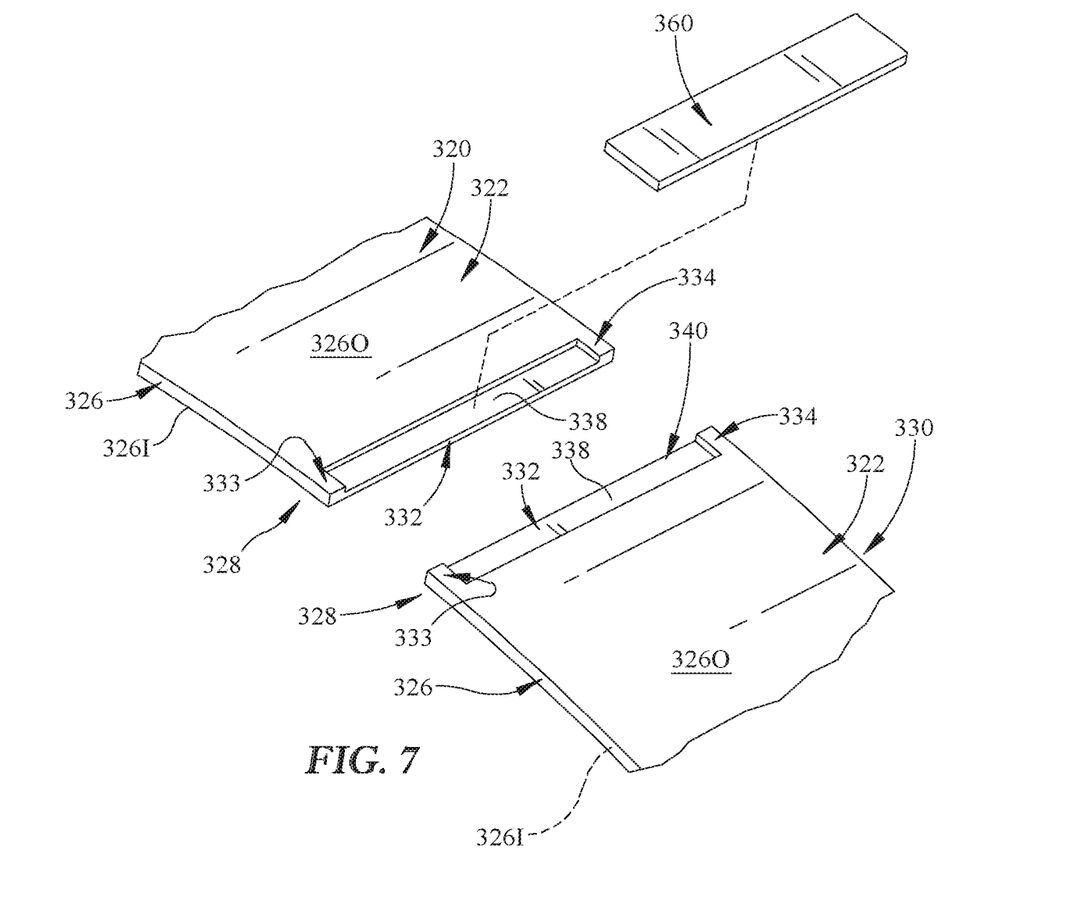
FIG. 7 is an exploded perspective view of a portion of a third gas turbine engine assembly including a first blade track component, a second blade track component, and a seal assembly adapted to block gasses from passing through a gap formed at an interface between the first lade track component and the second blade track component showing that the seal assembly includes a strip seal.
Figure 8:
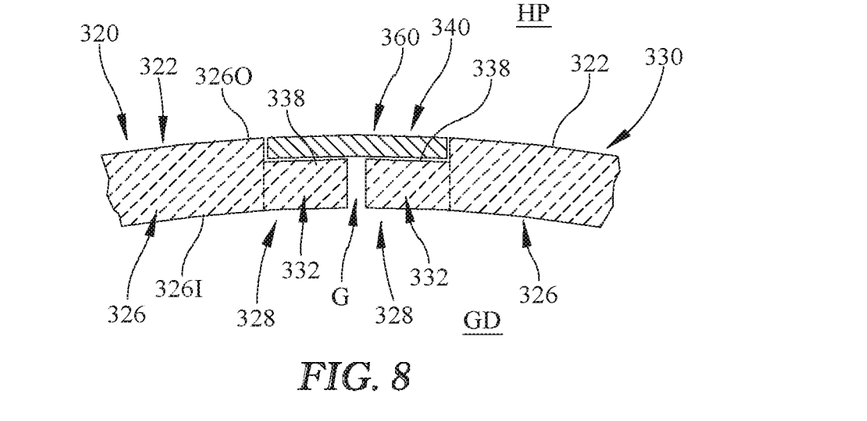
FIG. 8 is a cross-sectional view of the assembly in FIG. 7 when assembled showing that the strip seal is arranged in a channel formed by the blade track segments and is spaced from a gas path defined by the blade track components.

A third embodiment of the present disclosure is shown in FIGS. 7 and 8 in which only a strip seal 360 provides sealing between two adjacent blade track segments 320, 330. The strip seal 360 is illustratively a back side seal that is received in a channel 340.

The blade track segments 320, 330 are similar and each includes a runner 322 as shown in FIGS. 7 and 8. The runner 322, sometimes called a panel, is configured to configured to interact with gasses in the gas path GP and extends partway around the axis A.

The runner 322 of each blade track segment 320, 330 directly faces the gas path GP to block gasses from passing over turbine blades. The runner 322 includes a body portion 326 and end portions 328 as shown in FIG. 7. The body portion 326 is arcuate and has a radially-inwardly facing inner surface 326I and a radially-outwardly facing surface 326O. The end portions 328 support the strip seal 360 at circumferential ends of the body portion 326.

In the embodiment of FIGS. 7 and 8, the end portions 328 include a seal support shelf 332 and axial-retention shoulders 333, 334. The seal support shelf 332 extends circumferentially from the body portion 326 and provides a seal support surface 338 on which a portion of the strip seal 360 rests. The axial-retention shoulders 333, 334 are located at the forward end and the aft end of the channel 340 that receives the strip seal 360 and are shaped to block movement of the strip seal 360 axially out of the channel 340.

The seal support surfaces 338 face away from the axis A and are located nearer to the axis A than the outer surface 326O of the body portion 326 included in the blade track segments 320, 330. The seal support surfaces 338 cooperate to define a floor or radially-inner-most edge of the channel 340. A metallic carrier component 351 blocks radial movement of the strip seal 360 out of the channel 340.

Figure 9:
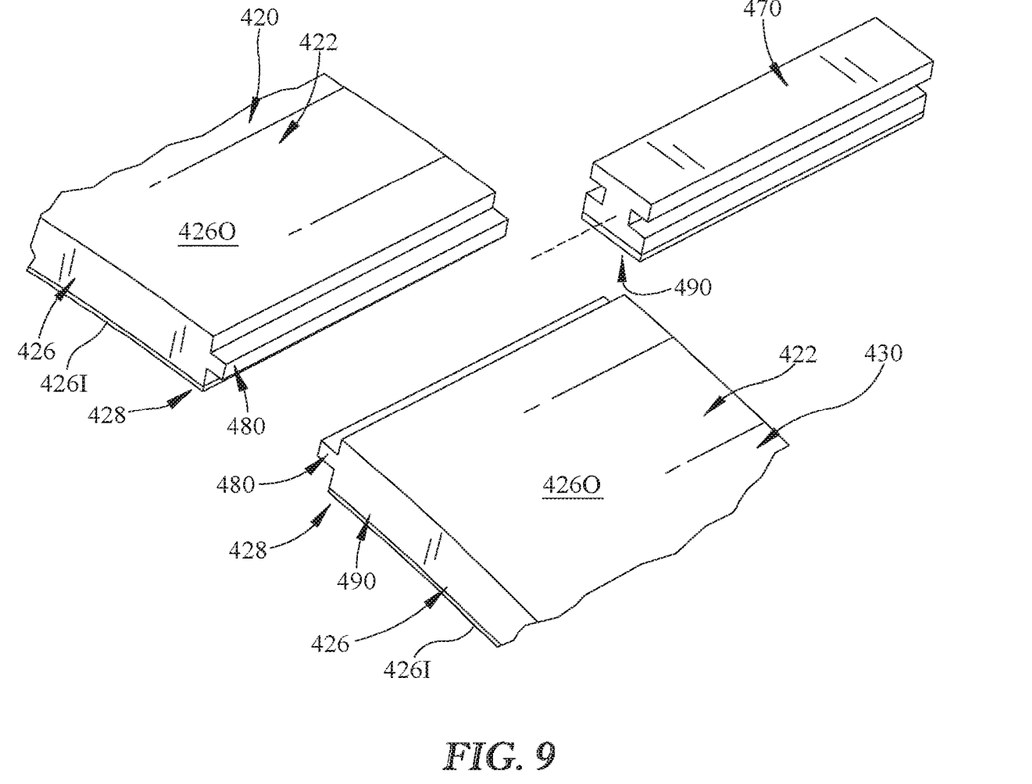
FIG. 9 is an exploded perspective view of a portion of a fourth gas turbine engine assembly including a first blade track component, a second blade track component, and a seal assembly adapted to block gasses from passing through a gap formed at an interface between the first lade track component and the second blade track component showing that the seal assembly includes a seal member mounted to receive tongues formed by the blade track components such that the seal member floats relative to the blade track components while sealing a gap between the components.
Figure 10:
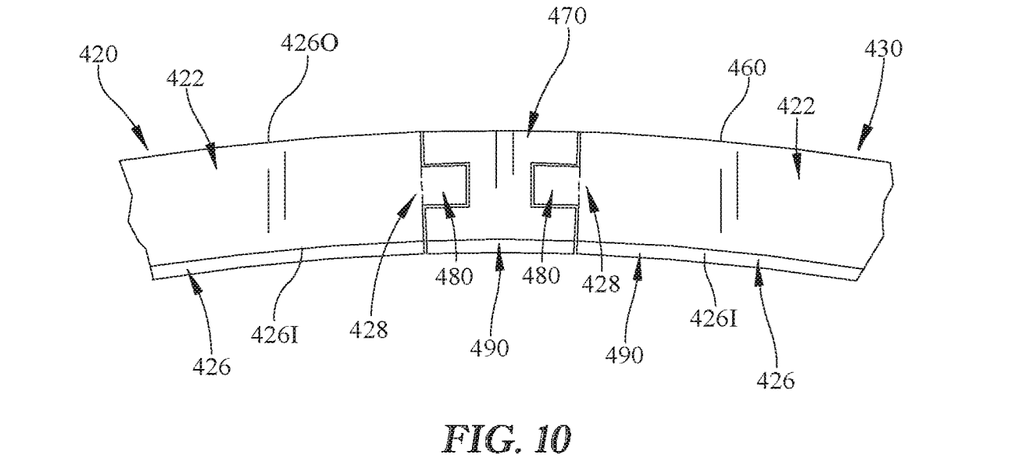
FIG. 10 is an elevation view of the assembly in FIG. 9 when put together showing that the seal member has an I-beam cross-sectional shape.

A fourth embodiment of the present disclosure is shown in FIGS. 9 and 10 in which an I-beam seal 470 is used to close the gap G between adjacent blade track segments 420, 430. The I-beam seal 470 is illustratively made from ceramic matrix composite materials and is coupled to the blade track segments 420, 430 to float so as to allow for relative motion of the segments 420, 430. The I-beam seal 470 has an I-shaped cross section when viewed in the axial direction. The I-beam seal 470 could be as formed with ZD layup, 3D weave architecture, or machined from a block of ceramic matrix composite material. In an alternative embodiment, a top portion of the I-beam section may rest on the outer most surface of the segment flow path section. In this way, a thick section could be maintained to carry the load from the I-beam and the outer inside corner could be partially or completely eliminated, thereby reducing stress in the component.

The blade track segments 420, 430 are similar and each includes a runner 422 as shown in FIGS. 9 and 10. The runner 422, sometimes called a panel, is configured to configured to interact with gasses in the gas path GP and extends partway around the axis A.

The runner 422 of each blade track segment 420, 430 directly faces the gas path GP to block gasses from passing over turbine blades. The runner 422 includes a body portion 426 and end portions 428 as shown in FIG. 9. The body portion 426 is arcuate and has a radially-inwardly facing inner surface 426I and a radially-outwardly facing surface 426O. The end portions 428 support the seal 470 at circumferential ends of the body portion 426.

In the embodiment of FIGS. 9 and 10, the end portions 428 include a tongue 480 that extends into the seal 470. The tongue 480 is spaced from the outer and inner surfaces 426O, 426I of the body portion 426 included in the blade track segments 420, 430. An abradable layer 490 may be applied to the gas path facing surfaces of the segments 420, 430 and the seal 470.

Ceramic matrix composite (CMC) segments or panels may be used in combustors, exhaust systems, and other heat shield applications. Accordingly, the features and seals of the present disclosure specifically embodied as a turbine shroud assembly may also be applied to other assemblies used in gas turbine engines or in other high temperature applications.

It is appreciated that thermal conductivity in CMC components is often lower than in metallic components. This can lead to higher thermal gradients and thermal stresses in components made from CMC. Such thermal stresses can present design issues when blind strip seal slots are formed in CMC components. Moreover, the manufacture of such blind strip seal slots into CMC components and the application of coatings into the slots can be difficult and/or costly.

According to the present disclosure, open ledges or shelves (i.e. 32, 232, 332) may support strip seals (i.e. 12, 360) without the need for a blind slot. A backing plate or strip 14 can be used to complete the groove retaining the strip seal. The backing plate 14 can sit on a separate ledge or shelf and can span the gap above the strip seal 12.

Shelf or open ledge features incorporated into the design of CMC components in the present disclosure can be easier to manufacture, inspect, and/or coat than designs incorporating blind slots. Open ledges can enable a variety of manufacturing process options and/or cutting tool sizes/ options for making components. Open ledges allow for direct line of sight for inspection and coating.

Use of a backing strip or plate like that disclosed herein provides operating cavity for the strip seals similar to that of a blind slot while also providing a stronger piece to interface with the rest of the assembly. Load applied to backing plate to hold it in place can be significant since the piece does not need to be thin and flexible.

Designs in accordance with the present disclosure can provide sealing that with reduced radial leakage and/or axial leakage. In particular, the gap between radial strip seals, which create pressure bulkheads and the flow path strip seals, can allow parasite leakage. Designs in accordance with the present disclosure can reduce the amount of area for leakage to flow through. Also of note is that the flow area for the disclosed designs is split into separate cavities which will have difference pressures and different restrictions entering them. The net result would be less axial flow.

Designs in accordance with the present disclosure can control the impact of any local hot gas ingress along the strip seal 12. It does this by creating an axial cavity above the strip seal and below the backing plate or strip. The effect this is likely to have is to even out the pressure along the backing strip gap compared to the flow path. This is likely to lower the peak pressure along with axial cavity compared to the flow path, thereby reducing the amount of local hot gas ingress into the radially outward componentry. Also, after local ingress into this cavity, the air will also mix some, reducing the temperature of any air that ingresses further. These two effects (Reduced peak pressure and mixing) will reduce the amount and effect of any flow path hot gas that does ingress above the backing plate.

Making both the strip seal and/or backing plate out of the CMC could provide ability to take advantage of the CMC high temperature capability while protecting metal components from excessively hot gas. This also enables a lowering of the back side pressure by enabling design to handle more local hot gas ingress. This could be beneficial by lowering pressure loading and resulting stresses on ceramic matrix composite materials and by lowering the pressure differentials and resulting parasite leakage flow rates. If the strip seal and/or backing plate are CMC, then damage to the rest of the engine could be less if a CMC component fails and becomes loose in the flow path.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:
1. A gas turbine engine assembly, the assembly comprising
a first component comprising ceramic matrix materials, the first component including a panel that separates a high pressure zone from a low pressure zone, the panel including a body portion and an end portion, the end portion of the first component including a seal-support shelf that provides a seal-support surface facing the high pressure zone that is located nearer to the low pressure zone than an outer surface of the body portion and a plate-support shelf that provides a plate-support surface arranged to face the high pressure zone and the plate-support surface is located nearer to the low pressure zone than the outer surface of the body portion,
a second component comprising ceramic matrix materials and arranged adjacent the first component to form a gap therebetween, the second component including a panel that separates the high pressure zone from the low pressure zone, the panel including a body portion and an end portion arranged in confronting relation with the end portion of the first component, the end portion of the second component including a seal-support shelf that provides a seal-support surface facing the high pressure zone that is located nearer to the low pressure zone than an outer surface of the body portion and a plate-support shelf that provides a plate-support surface arranged to face the high pressure zone and the plate- support surface is located nearer to the low pressure zone than the outer surface of the body portion, a strip seal arranged in a channel having a floor defined by the seal-support surfaces of the first component and the second component, the channel shaped to open to face the high pressure zone, the strip seal sized to extend across the gap between the first component and the second component, and a backing plate arranged along a side of the strip seal facing the high-pressure zone so as to be located between the strip seal and the high-pressure zone outside the channel.

2. The assembly of claim 1, wherein an outer surface of the backing plate is substantially flush with the outer surface of the body portion of the panel included in the first component.

3. The assembly of claim 1, wherein the end portion of the panel included in the first component includes a forward shoulder and an aft shoulder shaped to block movement of the strip seal and the backing plate out of the channel in forward and aft directions.

4. The assembly of claim 1, wherein the first component includes an attachment feature that extends from the outer surface of the panel and is configured to be coupled to a metallic carrier component.

5. The assembly of claim 4, wherein the attachment feature extends over the plate-support surface of the first component to retain the backing plate in the channel.

6. The assembly of claim 1, wherein the end portion of the panel included in the first component includes a forward shoulder shaped to block movement of the strip seal out of the channel via motion in a forward direction.

7. The assembly of claim 1, wherein the end portion of the panel included in the first component includes a forward shoulder shaped to block movement of the strip seal out of the channel via motion in a forward direction along the axis and the end portion of the panel included in the second component includes a forward shoulder shaped to block movement of the strip seal out of the channel via motion in the forward direction.

8. The assembly of claim 7, wherein the end portion of the panel included in the first component includes an aft shoulder shaped to block movement of the strip seal out of the channel via motion in an aft direction along the axis and the end portion of the panel included in the second component includes an aft shoulder shaped to block movement of the strip seal out of the channel via motion in the aft direction.

9. The assembly of claim 1, wherein the strip seal and the backing plate are independent components.

10. The assembly of claim 1, wherein the strip seal and the backing plate are integrally formed into a single, one-piece component.

11. A turbine shroud assembly adapted for use in a gas turbine engine, the assembly comprising a first blade track segment comprising ceramic matrix materials, the first blade track segment including a runner configured to interact with gas path gasses that extends partway around an axis and an attachment feature that extends radially outward from the runner away from the axis, the runner including a body portion and an end portion, the end portion including a seal-support shelf that provides a seal-support surface facing away from the axis that is located nearer to the axis than an outer surface of the body portion and a plate-support shelf that provides a plate-support surface arranged to face away from the axis and is located nearer to the axis than the outer surface of the body portion while being further from the axis than the seal-support surface, a second blade track segment comprising ceramic matrix materials and arranged adjacent to the first blade track segment to form a gap therebetween, the second blade track segment including a runner configured to interact with gas path gasses that extends partway around the axis and an attachment feature that extends radially outward from the runner away from the axis, the runner including a body portion and an end portion, the end portion including a seal-support shelf that provides a seal-support surface facing away from the axis that is located nearer to the axis than an outer surface of the body portion and a plate-support shelf that provides a plate-support surface arranged to face away from the axis and is located nearer to the axis than the outer surface of the body portion while being further from the axis than the seal- support surface, a strip seal arranged in a channel having a floor defined by the seal-support surfaces of the first blade track segment and the second blade track segment that opens to face away from the axis, the strip seal sized to extend across the gap between the first blade track segment and the second blade track segment, and a backing plate mounted over the channel to block movement of the strip seal out of the channel.

12. The assembly of claim 11, wherein the backing plate is a generally rectangular component having a length that extends along the axis, a width that extends tangent to a circumference about the axis, and a thickness that extends away from the axis, the length of the backing plate being greater than the width and thickness, and the width of the backing plate being greater than the thickness of the backing plate.

13. The assembly of claim 11, wherein an outer surface of the backing plate is substantially flush with the outer surface of the body portion of the runner included in the first blade track segment.

14. The assembly of claim 11, wherein the end portion of the runner included in the first blade track segment includes a forward shoulder and an aft shoulder shaped to block movement of the strip seal and the backing plate along the axis out of the channel in forward and aft directions.

15. The assembly of claim 11, wherein the attachment feature included in the first blade track segment extends over the plate-support surface to retain the backing plate in the channel.

16. The assembly of claim 15, wherein the attachment feature of the first blade track segment has a T-shape cross section when viewed in a circumferential direction around the axis such that the first blade track segment has a generally I-beam shape cross section when viewed in a circumferential direction.

17. The assembly of claim 16, wherein the attachment feature of the first blade track segment is formed to include a second strip seal slot, a second strip seal is inserted into the second strip seal slot, and the second strip seal is located to block movement of the backing plate away from the axis out of the channel.

18. The assembly of claim 11, wherein the strip seal and the backing plate are independent components.

19. The assembly of claim 11, wherein the strip seal and the backing plate are integrally formed into a single, one-piece component.

20. A method of assembling a turbine shroud assembly for a gas turbine engine, the method comprising arranging a first blade track segment comprising ceramic matrix composite materials circumferentially adjacent to a second blade track segment comprising ceramic matrix composite materials to form a gap therebetween, wherein the first blade track segment includes a runner that extends partway around an axis and an attachment feature that extends radially outward from the runner away from the axis, the runner including a body portion and an end portion, the end portion including a seal-support shelf that provides a seal-support surface facing away from the axis that is located nearer to the axis than an outer surface of the body portion and a plate-support shelf that provides a plate-support surface arranged to face away from the axis and is located nearer to the axis than the outer surface of the body portion while being further from the axis than the seal-support surface, wherein the second blade track segment includes a runner that extends partway around the axis and an attachment feature that extends radially outward from the runner away from the axis, the runner including a body portion and an end portion, the end portion including a seal-support shelf that provides a seal-support surface facing away from the axis that is located nearer to the axis than an outer surface of the body portion and a plate-support shelf that provides a plate support surface arranged to face away from the axis and is located nearer to the axis than the outer surface of the body portion while being further from the axis than the seal-support surface, inserting a strip seal in a channel having a floor defined by the seal-support surfaces of the first blade track segment and the second blade track segment that opens to face away from the axis, the strip seal sized to extend across the gap between the first blade track segment and the second blade track segment, and providing a backing plate mounted over the channel to block movement of the strip seal out of the channel.

* * * * *